United States Patent
Gilbert et al.

(10) Patent No.: US 6,477,909 B1
(45) Date of Patent: Nov. 12, 2002

(54) ACTIVE DAMPER FOR A COUNTERSHAFT TRANSMISSION

(75) Inventors: David Allen Gilbert; Jeffrey S Rayce, both of Royal Oak; Michael F O'Leary, Brighton, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/861,996

(22) Filed: May 21, 2001

(51) Int. Cl.[7] ................................................. F16H 3/08
(52) U.S. Cl. ............................................................. 74/333
(58) Field of Search ................................... 74/333, 335

(56) References Cited

U.S. PATENT DOCUMENTS 5,020,923 A * 6/1991 Heitz et al. ................... 384/99

* cited by examiner

Primary Examiner—Dirk Wright
(74) Attorney, Agent, or Firm—Laura C. Hargitt

(57) ABSTRACT

A powertrain has a countershaft transmission and a throttle controlled engine. The transmission has an operator controlled friction clutch that is effective to connect and disconnect the transmission and the engine. The transmission also has coaxially aligned input and output shafts and a countershaft parallel therewith. The input shaft, countershaft, and output shaft are connected through meshing gears. In order to maintain the lash between the connecting gears, a selectively actuatable friction damper is disposed between the input shaft and the output shaft. The damper is actuated during transient events that would otherwise cause the gear meshes to separate resulting in noise.

5 Claims, 2 Drawing Sheets

ACTIVE DAMPER FOR A COUNTERSHAFT TRANSMISSION

TECHNICAL FIELD

This invention relates to damper mechanisms and more particularly to damper mechanisms in a counter shaft transmission.

BACKGROUND OF THE INVENTION

Countershaft transmissions, often termed manual transmissions, have an input shaft, a countershaft, and an output shaft. The input shaft and countershaft are interconnected by meshing gears (head gear set). The countershaft and the output shaft are interconnected by a plurality of meshing gears (speed gears) that are selectively connectible to one of the shafts through synchronizer clutch arrangements. Thus a plurality of gear meshes are present between the input shaft and the output shaft.

The speed ratio between the input shaft and the output shaft is controlled by the meshing speed gears. The speed ratio between the input shaft and the output shaft is changed by interchanging the synchronizers that control the connection of the speed gears to their respective shafts. The head gear set and the active speed gear set have a lash condition. Under some operating conditions, the lash condition of the head gear set and the active speed gear set can reverse resulting in a noise or gear rattle caused by the lash reversal. This noise situation can occur during transient drive events such as throttle "tip in" and rapid clutch disengagement. As is well-known, the clutch is disengaged and re-engaged for each ratio interchange and during stopping and starting of the vehicle.

Some attempts have been made to quiet the gear disturbance. These include selecting specific bearing types, transmission architecture, and gear design to name a few. Each of these attempts result in increased drag on the shafts which is continuously present and therefore reduces the overall efficiency of the transmission.

SUMMARY OF THE INVENTION

It is an object of the present invention to provide an improved damper mechanism for use in a countershaft transmission.

In one aspect of the present invention, a selectively operable friction surface is disposed between two of the active shafts in a countershaft transmission. In another aspect of the present invention, an actuator is slidably positioned in one of the shafts to enforce activation of the friction surface. In yet another aspect of the present invention, the friction surface, when activated, is effective to retard any speed relation change between the input shaft and the output shaft of the transmission. In still another aspect of the present invention, the friction surface, when activated is effective to prevent a change in gear lash between meshing gears on the input shaft and the countershaft, and between active meshing gears on the countershaft and the output shaft.

The countershaft transmission has an input shaft that is coaxially aligned with and output shaft. A countershaft extends axially parallel with the input and output shafts. A head gear set having a member drivingly connected with each of the input shaft and the countershaft cause these shafts to rotate in opposite directions. A plurality of speed gear sets disposed on the countershaft and the output shaft are selectively actuated to establish respective speed ratios between these shafts. Each of the speed gear sets has one gear member continuously rotatable with one shaft and the other gear member is selectively connectable with the other shaft by a synchronizer clutch. A selectively actuatable clutch is disposed between an engine crankshaft and the transmission input shaft.

A selectively engageable friction member is positioned between the input shaft and the output shaft. A linear actuator, slidably disposed in the input shaft, is energized to cause a frictional drive relation between the input shaft and the output shaft which presents the speed relation therebetween from changing rapidly. Since the speed relation between the input shaft and output shaft is unchanging, the speed relation between the countershaft and the other shafts is also unchanging. The linear actuator is operated by an electromagnetic mechanism, in one embodiment, when the system is subjected to a transient condition that would be effective to reverse the gear lash between the mating gears. Such transient conditions are caused by rapid clutch disengagement or throttle release (throttle tip out). Since rapid changes in rotational acceleration are known to cause gear separation noise, other control mechanisms such as rotational acceleration mechanisms, which can be mechanical, hydraulic or electrical, can also be employed to effect the actuation of the friction member. However, since the conventional electronic control unit for the vehicle has all of the input signals necessary to control the actuation of the friction member, the electrically actuated piston is deemed to be preferred.

DESCRIPTION OF AN EXEMPLARY EMBODIMENT

Figure 1:
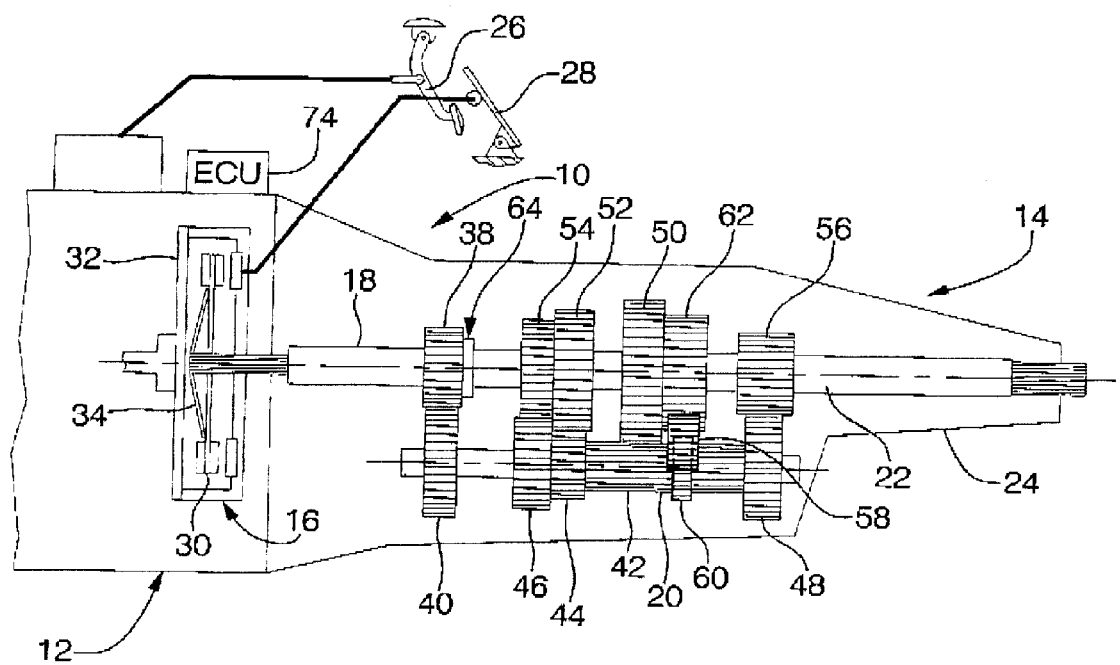
FIG. 1 is a diagrammatic representation of a powertrain having a transmission incorporating the present invention.

A powertrain 10 has an engine 12 and a transmission 14. The transmission 12 includes a manually actuated clutch assembly 16, an input shaft 18, a countershaft 20, and a output shaft 22 disposed in a housing 24. The input shaft 16 is aligned coaxially with the output shaft 22 and the counter shaft 20 is rotatably supported in the housing 24 in parallel relation with both the input shaft 18 and the output shaft 22. The engine 12 has a throttle control 26 and the clutch assembly 16 has a clutch control 28. Both of the controls 26 and 28 are manually operated by the operator. The clutch assembly 16 includes a friction element 30 that is forced into and out of engagement with an engine flywheel 32 by actuation of the clutch control 28 and a diaphragm spring 34. When the clutch 16 is engaged, the engine will rotate the input shaft 18.

The input shaft has a head gear 38 drivingly connected thereto and meshing with a head gear 40 that is drivingly connected with the countershaft 20 such that the countershaft 20 will rotate whenever the input shaft 18 is rotating. The countershaft 20 has a plurality of speed or ratio gears 42, 44, 46, and 48 drivingly connected therewith and meshing with respective speed or ratio gears 50, 52, 54 and 56 that are disposed on the output shaft 22. A reverse idler 58 is rotatably mounted on an idler shaft, not shown, and is meshing with a ratio gear 60 on the countershaft 20 and a ratio gear 62 on the output shaft 22. Each of the ratio gears 50, 52, 54, 56, and 62 are selectively individually connectable with the output shaft 22 by respective synchronizers, not shown, of conventional design. A selectively actuatable damper assembly 64 is positioned between the input shaft 18 and the output shaft 22, A more detailed showing of the damper assembly is shown in FIG. 3 which will be discussed later in the specification.

When the operator wishes to change the speed ratio between the input shaft 18 and the output shaft 22, the throttle control 26 is released and clutch mechanism is 28 is actuated by the operator. The operator then manually, through a conventional shift control linkage not shown, manipulates the synchronizers to release one ratio and engage the other. This operation is well-known. Also during vehicle deceleration, the operator releases the throttle control 26 to permit the engine to reduce in speed thereby slowing the vehicle. The throttle release is also known as "tip out".

Figure 2:
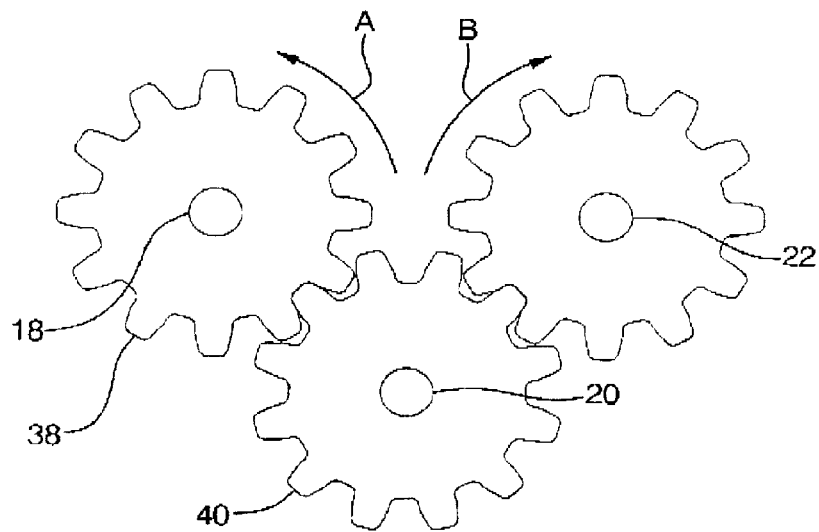
FIG. 2 is a diagrammatic representation showing the gear tooth mesh.

FIG. 2 is a representation of the meshing relation between the head gear 38 on the input shaft 18, the head gear 40 on the countershaft 20, and the ratio gears on the countershaft 20 and the output shaft 22. The ratio gears shown in FIG. 2 are only representative of the ratio gears shown in FIG. 1 and the output shaft 22 is shown rotated out of alignment with the input shaft 18 for clarity. The arrows A and B represent the direction of drag torque that is imposed on the damper 64 when actuated.

Figure 3:
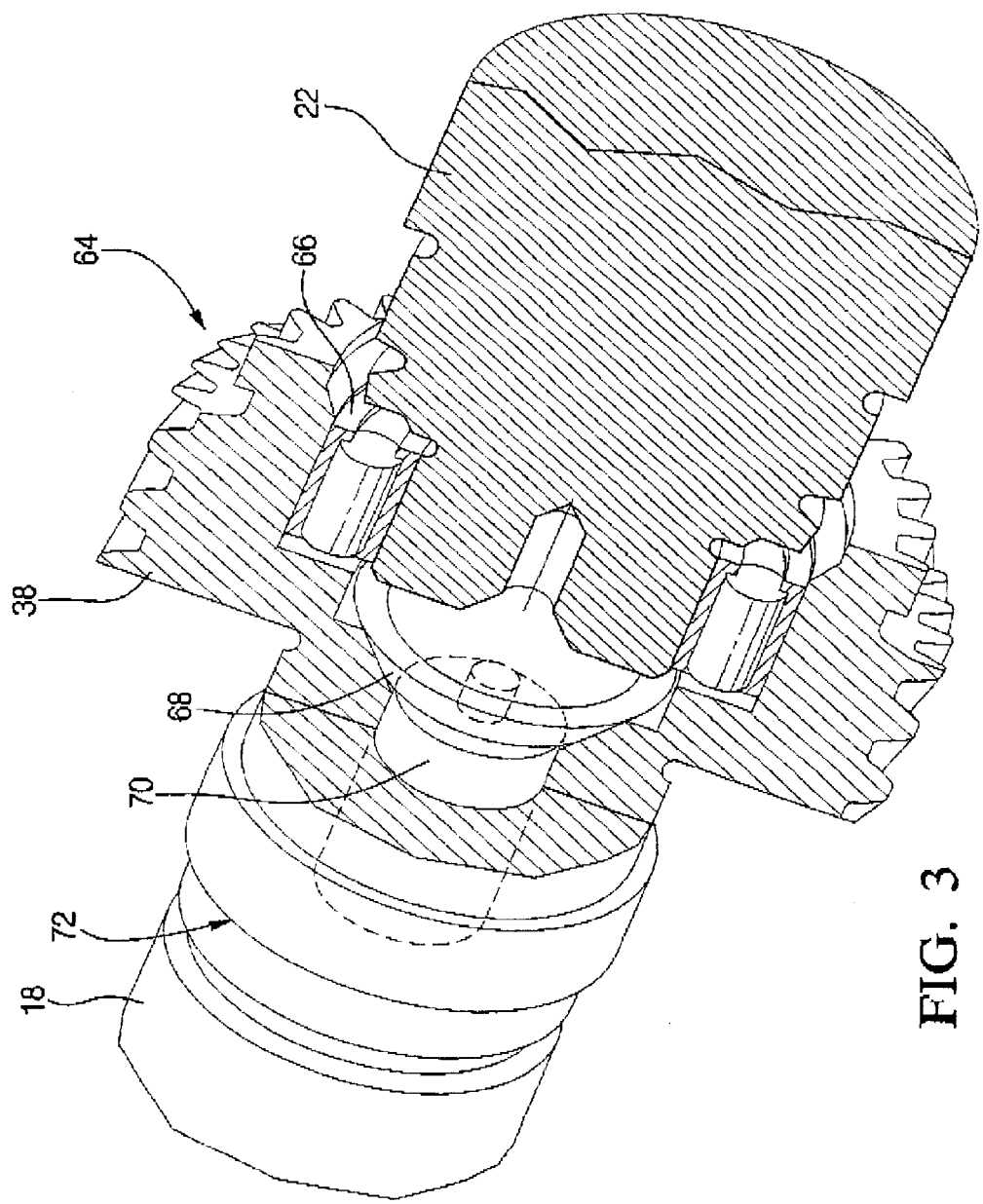
FIG. 3 is a sectional isometric view of a portion of a transmission incorporating the present invention.

FIG. 3 is a representation of a damper assembly 64 incorporating the present invention. The damper assembly 64 is disposed to provide a slipping frictional drive between the input shaft 18 and the output shaft 22 when actuated. The output shaft 22 is rotatably supported on the input shaft 18 by a conventional roller bearing 66. The damper assembly 64 includes a friction element 68, a linear actuator piston 70 and an electrical connection in the form of a slip ring 72. The slip ring 72 is connected electrically with a conventional electronic control unit (ECU) 74 that controls engine performance and has a plurality of sensors that include a throttle position sensor, a clutch actuator sensor, and input and output speed sensors to name a few. The ECU 74 includes a conventional programmable digital computer that issues commands to the powertrain 10.

The ECU 74 also issues commands to the damper assembly 64 to cause the linear actuator 70 to enforce slipping frictional engagement between the input shaft 18 and a flat end surface 76 formed on the output shaft 22. When the damper assembly is actuated, changes in relative motion between the input shaft 18, the countershaft 20, and the output shaft 22 are restrained due to the frictional engagement. Therefore the drag torque and direction remain essentially unchanged such that the tooth contact between the torque carrying gear members is undisturbed. In other words, the gears on the input shaft 18, the countershaft 20, and the output shaft 22 are constrained from moving into their lash zones. The frictional engagement of the damper assembly occurs only when significant changes in gear lash might be present. Therefore the efficiency of the powertrain is not significantly affected.

Significant changes in the gear lash can occur during various operating conditions. If the clutch is rapidly disengaged, the torque carrying ratio gear set and the head gear set change from a forward driven mesh to a reverse driven mesh. This results in noise in the clutch, the splines, and the gear meshes. Another situation wherein the gear lash might change is upon a sudden release of the throttle which results in a rapid decrease in engine speed and therefore the speed of the input shaft 18. The actuation under this operating condition also prevents the gear noise, due to gear lash changes, from occurring. In each of these and many other operating conditions, the ECU 74 anticipates the gear lash change and actuates the damper assembly 64 to prevent the noise that might otherwise occur. While the actuation of the damper assembly 64 is shown as an electrically actuated device, other mechanisms are also available to provide the desired actuation. In each of the operating conditions that result in gear noise or clutch clunk, the input shaft undergoes a rapid acceleration. A rotational acceleration control mechanism, of mechanical, hydraulic, or electrical content, can be incorporated into the damper assembly to actuate the friction element when an inordinate acceleration occurs at the input shaft 18. The control mechanism can be set to ignore acceleration levels that occur within the normal operating range of the powertrain 10.

What is claimed is:

1. A countershaft transmission in a powertrain having a throttle controlled engine, said transmission comprising:

a selectively engageable friction clutch to connect and disconnect the engine and the said transmission;

an input shaft selectively drivingly connected with said friction clutch;

an output shaft coaxially aligned with said input shaft;

a countershaft disposed parallel with both said input shaft and said output shaft;

a head gear set drivingly connected between said input shaft and said countershaft for transmitting power therebetween;

a plurality of ratio gear pairs selectively operatively connected between said countershaft and said output shaft for transmitting power therebetween;

a damper mechanism including a friction element disposed axially between said input shaft and said output shaft, an actuator selectively operable to enforce frictional engagement between said input shaft and said output shaft to maintain a lash condition between said head gear set and an active pair of said ratio gears during a transient condition of power transfer between said input shaft and said output shaft by way of said countershaft.

2. The transmission defined in claim 1 further comprising:

said actuator being electrically actuated to enforce said frictional engagement of said friction element with said input shaft and said output shaft.

3. The transmission defined in claim 2 further comprising:

said actuator being a linear device disposed within said input shaft; and said friction element being encompassed by a head gear of said head gear set disposed on said input shaft.

4. The transmission defined in claim 1 further comprising:

said damper mechanism being actuated in response to a sudden release of a throttle of the throttle controlled engine.

5. The transmission defined in claim 1 further comprising:

said damper mechanism being actuated in response to a rapid disengagement of said friction clutch.

* * * * *